(12) United States Patent
Song et al.

(10) Patent No.: US 8,046,351 B2
(45) Date of Patent: Oct. 25, 2011

(54) METHOD AND SYSTEM FOR SELECTING SEARCH ENGINES FOR ACCESSING INFORMATION

(75) Inventors: Yu Song, Pleasanton, CA (US); Doreen Cheng, San Jose, CA (US); Swaroop Kalasapur, Sunnyvale, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 482 days.

(21) Appl. No.: 11/895,124

(22) Filed: Aug. 23, 2007

(65) Prior Publication Data

US 2009/0055388 A1    Feb. 26, 2009

(51) Int. Cl.
*G06F 17/30* (2006.01)
(52) U.S. Cl. ........................................ 707/710; 707/723
(58) Field of Classification Search .............. 707/3, 710, 707/723
See application file for complete search history.

(56) References Cited

U.S. PATENT DOCUMENTS

| | | | |
|---|---|---|---|
| 6,327,590 B1 | 12/2001 | Chidlovskii et al. | |
| 7,860,895 B1 * | 12/2010 | Scofield et al. | 707/802 |
| 2006/0288001 A1 * | 12/2006 | Costa et al. | 707/5 |
| 2007/0233672 A1 | 10/2007 | Sanfacon et al. | |
| 2007/0250500 A1 | 10/2007 | Ismalon | |
| 2008/0114786 A1 * | 5/2008 | Nir et al. | 707/100 |
| 2008/0201304 A1 | 8/2008 | Sue | |
| 2008/0201317 A1 * | 8/2008 | Sue | 707/5 |
| 2009/0070318 A1 | 3/2009 | Song et al. | |

OTHER PUBLICATIONS http://www.webmd.com/, Webmd.com, downloaded Jan. 30, 2008.
Seth, S. et al, "Eureka! Your own search engine has landed!", The Official Google Blog, Oct. 23, 2006, pp. 1-5, http://googleblog.blogspot.com/2006/10/eureka-your-own-search-engine-has.html, United States.
U.S. Final Office Action for U.S. Appl. No. 11/900,525 mailed on Mar. 18, 2010.

* cited by examiner

*Primary Examiner* — John E Breene
*Assistant Examiner* — Dennis Myint
(74) *Attorney, Agent, or Firm* — Beyer Law Group LLP (57) ABSTRACT

A method and system for access to information using search engines is provided. A search engine is selected for executing a query based on search engine characteristic information and the query. The characteristic information for each search engine includes information representing searching capabilities of each search engine. Selecting a search engine further involves determining a similarity between the query and the characteristic information for each search engine, and selecting a search engine based on the similarities such that a search engine with the highest similarity may be selected for executing the query and returning search results.

36 Claims, 6 Drawing Sheets

METHOD AND SYSTEM FOR SELECTING SEARCH ENGINES FOR ACCESSING INFORMATION

FIELD OF THE INVENTION

The present invention relates to providing access to electronic information, and in particular to providing access to information using search engines over the Internet.

BACKGROUND OF THE INVENTION

With the proliferation of information available on the Internet and the World Wide Web (the Web), many users utilize the Web for access to desired information. There are multiple search engines, each of which has limitations. For example, Webmd.com is specialized in medical information, while Google.com is a general-purpose search engine. A user who seeks medical information can get better results using Webmd.com instead of Google.com. Conventional approaches to seeking relevant information on the Web are tedious and ineffective. One approach involves using a meta search engine, where a user generates search queries for the meta search engine to send to multiple predefined Internet search engines. This limits the scope of the search to the predefined Internet search engines, and is not focused on selecting specialized search engines that are likely to provide information relevant to the queries.

Another approach involves using a vertical search engine for a specialized search in a specific information domain (e.g., a vertical search engine for all health related information). A related approach involves a user selecting among a set of vertical search engines. These require the user to have knowledge of available vertical search engine capabilities, and to provide keywords that suit searching capabilities of such search engines. However, such approaches are limited to the type and amount of information describing search engines.

BRIEF SUMMARY OF THE INVENTION

The present invention provides a method and system for providing information using search engines. One embodiment involves obtaining characteristic information representing searching capabilities of each one of multiple search engines, and selecting a search engine among the multiple search engines for executing a query based on said characteristic information and the query. Obtaining the characteristic information for each search engine may include determining the characteristic information based on search results retrieved by that search engine. Determining characteristic information for each search engine may further include determining characteristic keywords representing searching capabilities of that search engine.

In one implementation, selecting a search engine include determining a similarity between the query and the characteristic information for each search engine, and selecting a search engine based on the similarities such that a search engine with the highest similarity is selected for executing the query and returning search results. The search results are analyzed for quality based on the query and/or the characteristic information, and the selected search engine is scored based on quality of the search results for the query and/or the characteristic information. The scores are used in determining a similarity between the query and the characteristic information for each search engine.

These and other features, aspects and advantages of the present invention will become understood with reference to the following description, appended claims and accompanying figures.

DETAILED DESCRIPTION OF THE INVENTION

The present invention provides a method and system for providing access to information by selecting search engines based on queries. In one embodiment this involves determining searching capabilities of search engines by characterizing the search engines based on the search results they return. A search engine is then selected for a query based on such characterization, for executing the query.

Figure 1:
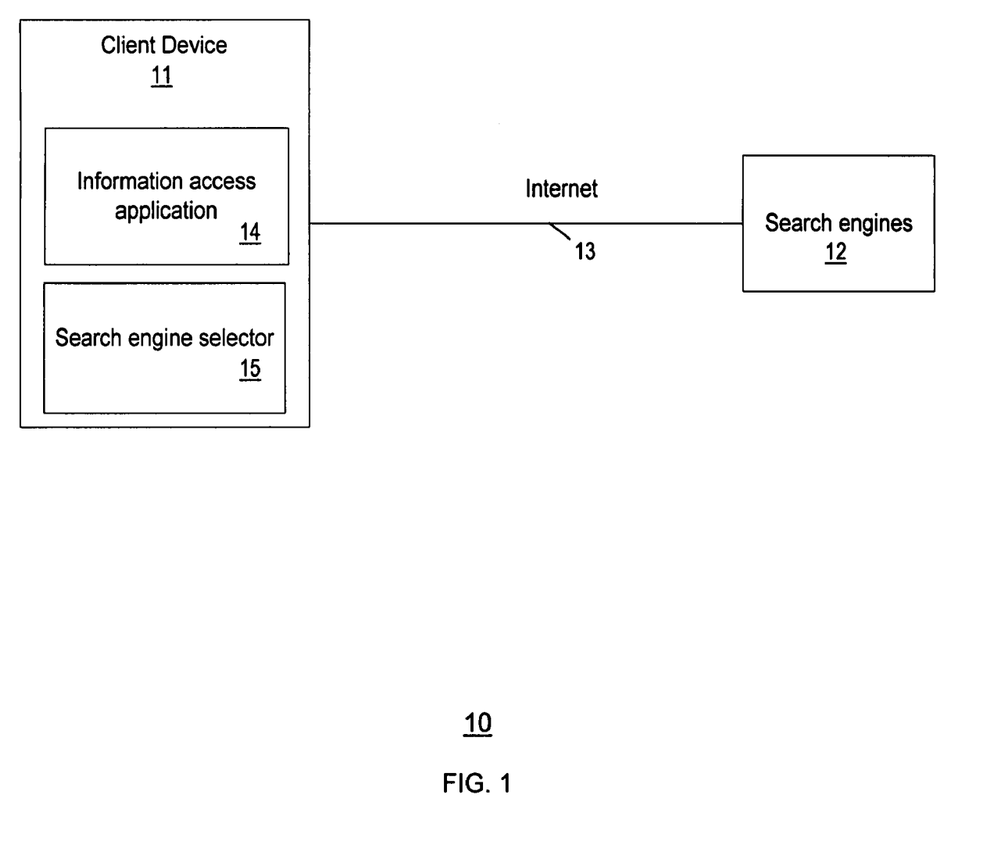
FIG. 1 shows a functional block diagram of an information access architecture, according to an embodiment of the present invention.

FIG. 1 shows a functional block diagram of an information access architecture 10, according to an embodiment of the present invention. A client device 11, such as a personal computer (PC), consumer electronics (CE) device, etc., has access to search engines 12 over the Internet 13. The client device 11 implements an information access application such as a Web browser 14 and a search engine selector 15 for selecting among the available search engines.

For each of one or more available search engines, an initial list of characteristic keywords is selected to represent the characteristics of each search engine. As such, each search engine has a corresponding set of characteristic keywords that represent the searching capabilities of that search engine, to be used in determining which search engine to select for executing a given query.

A score is given to each characteristic keyword for each search engine. Scores for characteristic keywords per personalized search engine are accumulated over multiple searches, and the scores are used in selecting a personalized search engine for executing a query (described further below). Then, given a query that includes keywords, a similarity value between the query keywords and the characteristic keywords for each search engine is computed. The scores are used to calculate the similarity between each search engine characteristic keywords and the query keywords, and the similarity values are used to select a search engine for executing the query. A higher similarity value for a search engine indicates that the search engine is more appropriate for executing the query in terms of relevance/quality of the search results, and should therefore be selected.

The selection process is illustrated by way of an example, wherein a search engine A has associated characteristic keywords "San Jose" with a score 0.1 and "Restaurant" with a score 0.9, and another search engine B has associated characteristic keywords "San Jose" with a score 0.8 and "Restaurant" with a score 0.3. Then, for a query "San Jose French Restaurant Options," an example similarity computation for each search engine adds the score for each keyword together, such that search engine A would have a similarity value 0.1+0.9=1.0 for that query, while the search engine B would have a similarity value 0.8+0.3=1.1 for that same query. Another example of the similarity computation using the scores is a cosine-based similarity computation. Other similarity computation schemes based on the scores can also be used. The computed similarity values are then used for selecting among the search engines. In the above example, the search engine B which has the highest computed similarity value for the query, is selected as the search engine for executing the query.

When a search engine is selected, the query is provided to the selected search engine for execution. The search results from the search engine are provided in response to the query. The search results are also used to update the scores for the selected search engine. For example, the top few search results returned by the search engine are then analyzed to determine the quality of the search results based on the query (the quality of the search results can be defined in many ways, e.g., based on relevance to the query, such as the frequency, and location of occurrences of the query keywords and/or characteristic keywords in the search results, as described further below in conjunction with equations (1) and (2)).

The search engine characteristic keywords are a list of keywords that describe the topics of search domains that a search engine can best serve. For example, CNN.com can be described using, but not limited to the following characteristic keywords: "news, world, U.S., political, economy, headline" and etc. The search engine characteristic keywords can be created in various ways. For example, the characteristic keywords can be created manually by a person who is knowledgeable about which keywords best characterize a particular search engine. In another example, the characteristic keywords can be created semi-automatically by first automatically extracting keywords from description of a search engine. For instance, the FAQ or about page of the search engine Travelocity.com, at the URL http://svc.travelocity.com/about/main/0, ,TRAVELOCITY:EN|ABOUT PROD-SERV,00.html, can be used to extract characteristic keywords for the Travelocity.com search engine). The extracted keywords from the above URL can then be manually selected and edited to ensure the quality of characterization by the selected keyword. In yet another example, the characteristic keywords can be created by using a set of queries focusing on a particular topic, analyzing the search results and then optionally selecting keywords by a human expert.

For example, for characterizing the search engine Webmd.com, first a variety of queries are selected for diseases, medical information, drug information, etc. Those queries are then executed on Webmd.com to retrieve results, and a domain expert on health-related fields selects those crucial keywords that can best describe the search capabilities of Webmd.com in terms of focus, breadth, etc. For example, "kidney disease syndrome" can be used as a query to retrieve results from Webmed.com and extract keywords about kidney related health information from the search results, wherein the extracted keywords can be used as characteristic keywords for the Webmd.com search engine. In another example, the query "kidney disease syndrome transplant biopsy" can be executed on different search engines, Webmd.com and Google.com. In this example, "transplant" and "biopsy" may be characteristic keywords of Webmd.com while they are not for Google.com. This is because these two words are more domain specific to health and disease while Google.com is a general-purpose search engine that is not specific to the field of health.

Each characteristic keyword for a search engine is given an initial score that is later updated in an iterative process based on the quality of the search results the search engine provides for that characteristic keyword (e.g., high/increasing score for high quality search results and low/decreasing score for low quality search results, etc.). The initial scores of keywords can be a simple, e.g., "1" to indicate a very good match for the search engine. The scores are updated based on additional searches, as described below.

Figure 2:
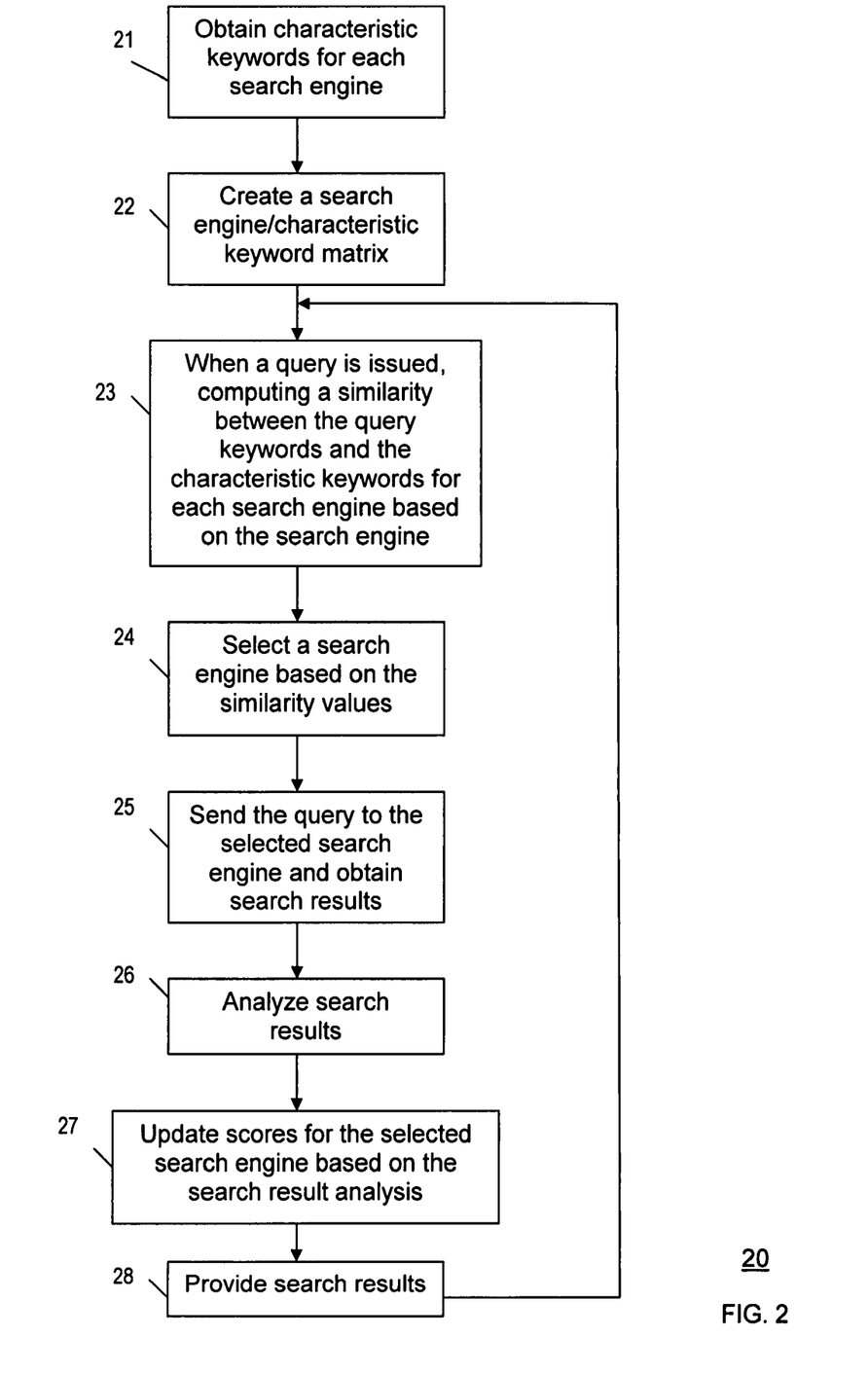
FIG. 2 shows an implementation of a process for selecting a search engine and executing a query for access to information, according to an embodiment of the present invention.

In one implementation, referring to FIG. 2, a process 20 for selecting a search engine and executing a query includes the following overall steps:

Step 21: Obtaining (and/or creating) a list of characteristic keywords representing the capability of each search engine in consideration.

Step 22: Creating a search engine/characteristic keywords scoring matrix including an entry for the score of each characteristic keyword for a search engine (search engine score), where the score for each search engine indicates how well that particular search engine performs searching for a particular characteristic keyword.

Step 23: When a query is issued, computing a similarity between the query keywords and the characteristic keywords for each search engine based on the search engine scores.

Step 24: Selecting the search engine that has the highest similarity.

Step 25: Sending the query to the selected search engine, and obtaining the search results.

Step 26: Selecting the top n results of the search results from the selected search engine, and analyzing the text of the results to determine quality of the results.

Step 27: Updating the scores in the matrix based on the quality of the search results, and optionally adding additional (new) characteristic keywords to the matrix for the selected search engine.

Step 28: Providing the search results in response to the query. The process then proceeds back to step 23 to wait for and process the next query.

Referring to Table 1 below, an example of the search engine/characteristic keyword scoring matrix is shown for $x>1$ search engines and $y \geq 1$ characteristic keywords per search engine. Each cell in the matrix is at the intersection of a search engine and a corresponding characteristic keyword, wherein the cell includes a score representing the relevancy of the search result from the search engine for the keyword. The scores are in the form $V_{ij}$, wherein i is the search engine (row) index and j is the keyword (column) index.

TABLE 1

Search engine/characteristic keywords matrix

|  | Keyword 1 | Keyword 2 | Keyword 3 | ... | Keyword y |
|---|---|---|---|---|---|
| Search engine 1 | V11 | V12 | V13 |  | V1y |
| Search engine 2 | V21 | V22 | V23 |  | V2y |
| Search engine 3 | V31 | V32 | V33 |  | V3y |
| ... |  |  |  |  |  |
| Search engine x | Vx1 | Vx2 | Vx3 |  | Vxy |

Figure 3:
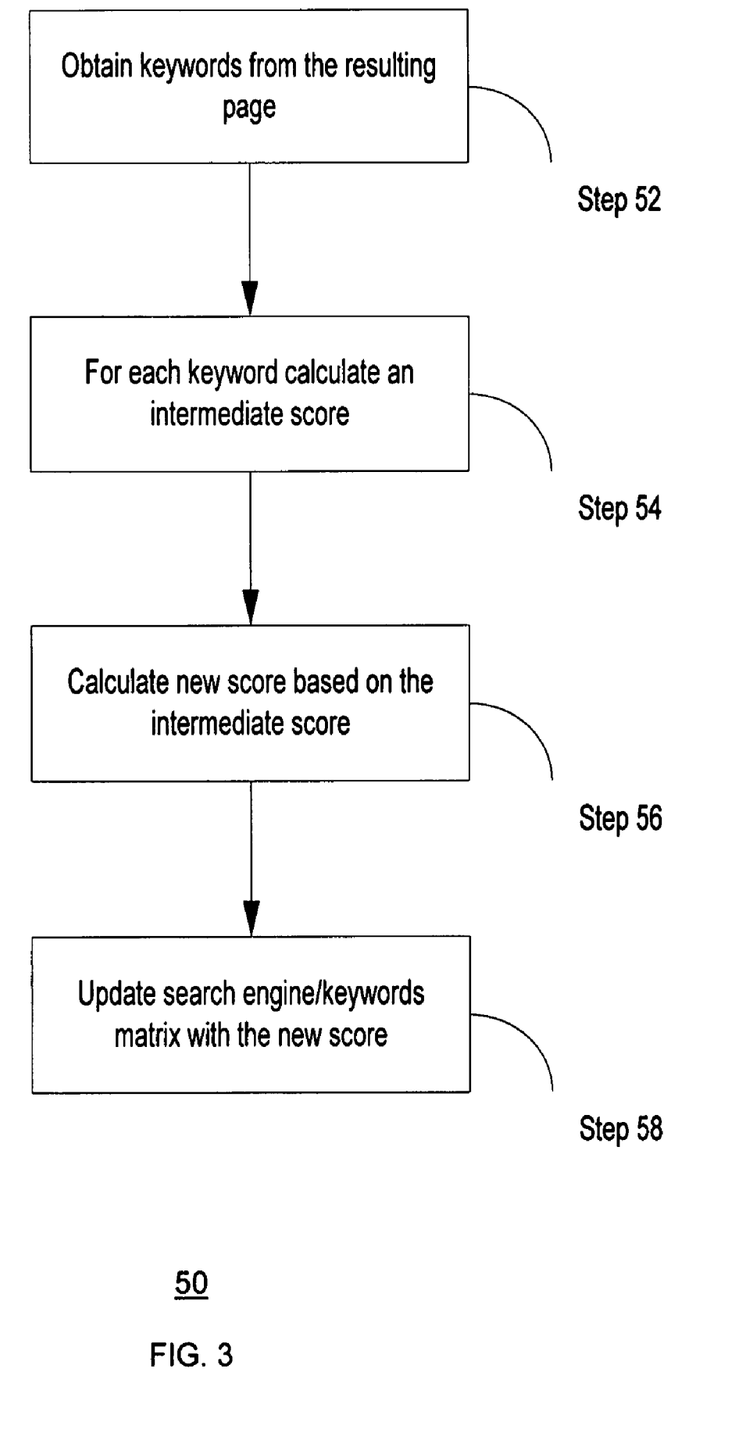
FIG. 3 shows a process for updating the scores in a search engine/characteristic keyword scoring matrix for a selected search engine, based on search results returned from the search engine for a query, according to an embodiment of the present invention.

FIG. 3 shows a process 50 for updating the scores in a search engine/characteristic keyword scoring matrix (e.g., Table 1) for a selected search engine, based on the search results returned from the search engine for a query. The process 50 includes the steps of:

Step 52: Obtaining keywords from the search results.

Step 54: For each obtained keyword, calculating an intermediate score S.

Step 56: Calculating a new score for the obtained keyword V based on the intermediate score S.

Step 58: In the search engine/keywords matrix, updating the search engine score for the obtained keyword with the new score V.

An implementation of the above steps is now described. Specifically, in step 52 the search results from the selected search engine are obtained as pages, optionally along with linked pages. Obtaining keywords from the search results includes analyzing the search results, such as web pages, to identify existing characteristic keywords for the selected search engine and/or extract new keywords as characteristic keywords for the selected search engine (also, snippets can be analyzed instead of entire web pages, depending on the trade-off between computation time and the quality of the results).

As such, the obtained keywords may include those characteristic keywords which are already in the matrix (e.g., characteristic Keyword 1, ..., x in Table 1 above) for the selected search engine, and/or additional (new) keywords that can be entered in the matrix as new characteristic keyword entries (along with a score), for the selected search engine.

In step 54, for each obtained keyword as a characteristic keyword for the selected search engine, an intermediate score S is computed based on a weighted sum of frequencies of occurrence of the characteristic keyword in a search results page. In one example, such an intermediate score S is calculated according to equation (1) below:

$$S = \frac{\sum_{i=1}^{m} W_i^R W_i^P W_i^Q (f_i^T + f_i^S + f_i^e + f_i^B)}{\sum_{i=1}^{m} (f_i^T + f_i^S + f_i^e + f_i^B)} \quad (1)$$

wherein $W^R$ is a weighting factor indicating the ranking of the results page returned by the selected search engine in which the keyword occurred; $W^P$ is a weighting factor indicating where the keyword occurred in the results page (e.g., in the title, in the body, and whether it is emphasized); $W^Q$ is a weighting factor indicating whether the keyword is in both the query and the existing characteristic keyword list (e.g., in Table 1) for the selected search engine. Superscripts T, S, B, and E for occurrence frequency f, represent the four (4) positions in a results page (or document) where a keyword can occur: title, subtitle, emphasized body, and non-emphasized body, respectively. The value m represents the number of search results selected for computing the score S, wherein i is the $i^{th}$ page/document in the top m results. Those skilled in the art can choose other types of criteria for the weighting.

Then in step 56, a score is computed for a keyword obtained from the search results returned by the selected search engine for the $n^{th}$ time. An example of calculating such a score can be according to equation (2) below:

$$V_n = aV_{n-1} + bS_n \quad (2)$$

wherein $V_n$ is the keyword score in an entry of the matrix when a search engine is selected for the $n^{th}$ time, $V_{n-1}$ is the keyword score when a search engine is selected for the $(n-1)^{th}$ time, and n is an integer n>1. Further, a and b are weighting factors based on certain heuristics for incrementally adjusting a new score (e.g., a+b=1.0, with 0<a, b<1, a=0.8, b=0.2 and $V_1$=1.0). In addition, $S_n$ is the interim keyword score computed according to equation (1) above. Then in step 58, the matrix (e.g., Table 1) is updated with the new score $V_n$ for an existing characteristic keyword (or a new keyword is added along with a score $V_n$) for the selected search engine.

The computation of S in equation (1) for a search engine and characteristic keyword can yield either a negative value or a positive value. A positive value indicates that a particular search engine characteristic keyword in the query has a higher significance in representing this search engine, while a negative value indicates that the characteristic keyword is less significant than previously expected. A new score for the characteristic keyword is then calculated using equation (2). The goal is for the value of $V_n$ for each matrix entry (i.e., $V_{ij}$ in Table 1) to gradually stabilize while considering changes that might occur to a search engine's capability. Heuristically, and in reality, search engines do not change their coverage of the Web in a short period of time, and it is expected that the significance of a characteristic keyword that represents the capability of a search engine, to eventually stabilize to a certain numeric score.

Figure 4:
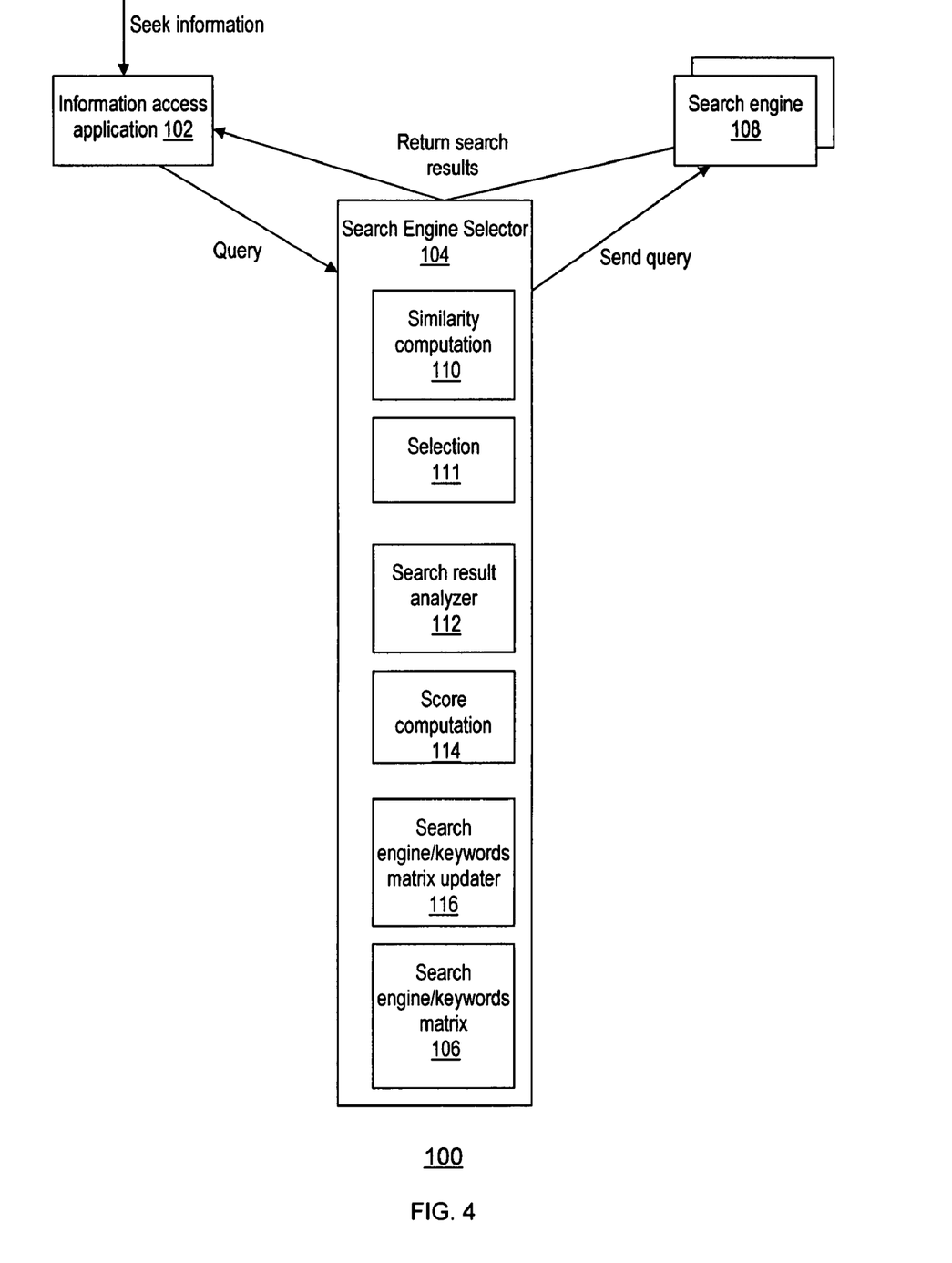
FIG. 4 shows a functional block diagram of another information access architecture, according to an embodiment of the present invention.

FIG. 4 shows a functional block diagram of an information access architecture 100 implementing the above steps, according to an embodiment of the present invention. The architecture 100 involves an information access (seek) application 102, a search engine selector 104, a search engine/keywords matrix 106 and one or more search engines 108.

The information access (seek) application 102 connects to the Internet for access to information. On the Internet, there is at least one search engine 108. The search engine selector 104 maintains the search engine/keywords matrix 106 such as Table 1 above. The search engine selector 104 can be implemented on the same device as the information access application 102 or on a different device.

Figure 5:
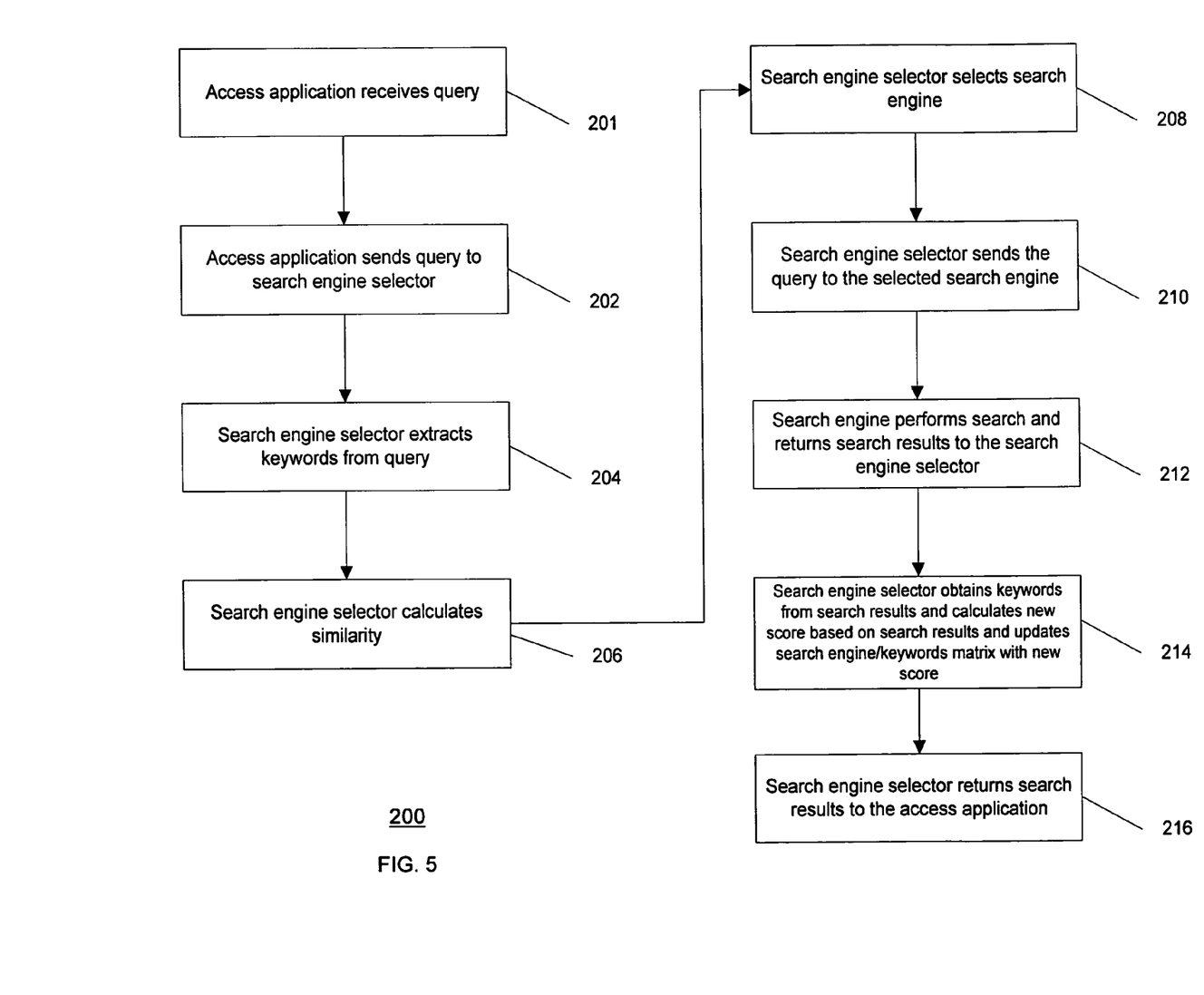
FIG. 5 shows an example information access process for selecting a search engine and executing a query for access to information, according to an embodiment of the present invention.

FIG. 5 shows an example information access process 200 using the architecture 100, according to an embodiment of the present invention. The process 200 includes the following steps:

Step 201: The information access application 102 receives a query (e.g., from a user or by an application) containing query keywords.

Step 202: The information access application 102 sends the query to the search engine selector 104.

Step 204: The query can either be free text or a list of keywords. When the query is free text, the selector 104 may preprocess the query (e.g., remove stop-words such as "is", "what", "where", etc.) to extract keywords from the free text.

Step 206: A similarity computation function 110 calculates the similarity between the query keywords and each search engine's characteristic keywords.

Step 208: A selection function 111 determines that a search engine 108 has the highest similarity, and selects that search engine.

Step 210: The search engine selector 104 sends the query to the search engine over the Internet.

Step 212: The search engine sends the search results back to the search engine selector 104 via the Internet.

Step 214: A search result analyzer function 112 processes each search result and obtains keywords from each search result as described above. For each extracted keyword, a score computation function 114 computes the score as described above in relation to FIGS. 2-3, and an updating function 116 updates the matrix 106.

Step 216: The search engine selector 104 then returns the search results back to the information access application 102.

Although in FIG. 4 the search result analyzer function 112, the score computation function 114 and the updating function 116 are shown as part of the search engine selector 104, these and other functions may be implemented separately. In one example, the search engine selector 104 can be implemented as a software module (e.g., application software, Java script, HTML, relational database, etc.) that executes on a client device. Further, the components 106, 110-116 can be implemented in two or more different modules.

As noted above, upon analysis of the search results from a selected search engine, additional keywords may be added to the search engine/keyword matrix as additional characteristic keywords for that selected search engine. This is because existing characteristic keywords in the search engine/keyword matrix may not cover all topics. For example, a keyword "DVD-A" appearing in a search result, may be a new keyword appearing in the search results during a search for music CDs on a search engine (e.g., Shopping.com). As such, the updating function 116 can expand the coverage of the search engine/keyword matrix for each search engine over time.

In this example, DVD-A is added as a new characteristic keyword in the search engine/keywords matrix for Shopping.com, and given a score of 1.0. If a subsequent query includes "DVD-A", the search engine Shopping.com is selected as the search engine for such a query, by cooperative action of the similarity computation and selection functions 110, 111. The score for "DVD-A" in relation to other search engine such as medicine.com, stock.com, etc., in the matrix would be 0. Based on the search results for subsequent queries, the computed score according to equations (1) and (2) above for "DVD-A" may decrease in relation to Shopping.com. In another example, based on search results for subsequent queries, the computed score according to equations (1) and (2) above for "DVD-A" may increase in relation to Medicine.com, Stock.com, etc. Table 2 below shows a numerical example for Table 1 after several queries. Other examples are possible.

TABLE 2

Search engine/characteristic keywords matrix

| | Keyword 1 | Keyword 2 | Keyword 3 | ... | Keyword y |
|---|---|---|---|---|---|
| Search engine 1 | 1.0 | 0 | 0 | | 0 |
| Search engine 2 | 0.5 | 0.3 | 0.2 | | 0.9 |
| Search engine 3 | 1.4 | 2.0 | 0 | | 0.1 |
| ... | | | | | |
| Search engine x | 2.0 | 3.0 | 0.5 | | 0 |

As such, selecting search engines according to the present invention allows for searching accuracy that increases with the accumulation of keyword scores per search engine over multiple searches. No special server is required for selecting search engines. For example, a meta search engine on the Internet is unnecessary. Instead, a search engine selector according to the present invention can be implemented on a client device, such as a PC, CE device, mobile device, etc., which receives queries. The present invention further allows extracting search engine characteristic keywords based on search results, even if the description of a search engine is scarce.

Figure 6:
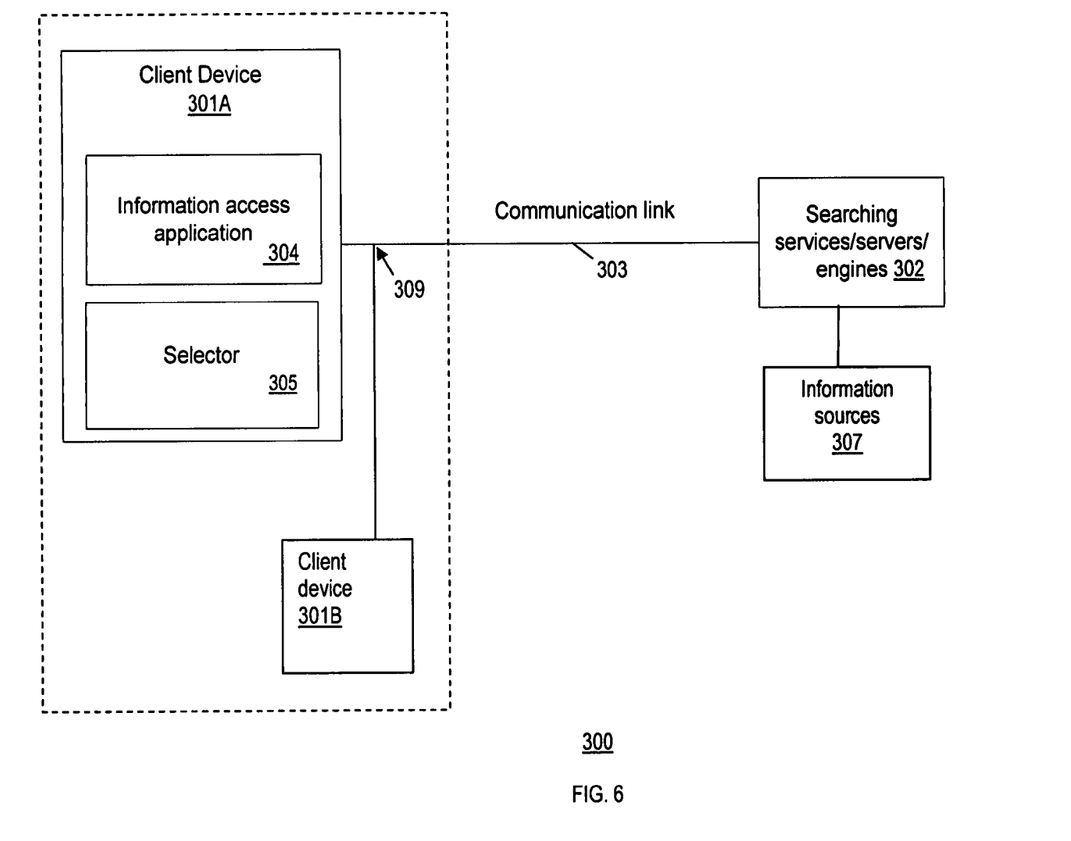
FIG. 6 shows a functional block diagram of another information access architecture, according to an embodiment of the present invention.

Although embodiments of the present invention are described in relation to search engines on the Internet, as shown by an example architecture 300 in FIG. 6, according to the present invention, a selector 305 in a client device 301A is useful for selecting searching services/servers/engines 302 for searching information sources 307 such as databases on other networks besides and/or in addition to the Internet. The selector 305 receives queries from the application 304, selects a searching service/server/engine, and communicates with the selected searching service/server/engine via the communication link 303 for sending queries thereto for execution. In selecting a searching service/server/engine, the selector 305 operates as discussed above. Another client device 301B is also shown, which may include the functionalities of the search engine selection functionalities of the client device 301A. The client devices 301A and 301B may be connected via a local area network (LAN) 309, which connects to the searching services/servers/engines 302 via the communication link 303.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for providing access to information using search engines, comprising:

obtaining characteristic information including a plurality of characteristic keywords representing searching capabilities of each one of multiple search engines, wherein each characteristic keyword is assigned a characteristic keyword score value;

maintaining separate characteristic keyword score values for the plurality of characteristic keywords for each search engine, wherein the score values are accumulated and updated over multiple searches;

in response to receiving a query including user-selected keywords, determining a similarity value for each search engine based on the characteristic keyword score values associated with the user selected query keywords of the query;

selecting a search engine among the multiple search engines for executing the query based on the rank of the multiple search engines using the similarity value;

sending the query to the selected search engine;

obtaining search results from the selected search engine;

selecting a predetermined number of obtained search results as top results; analyzing the top results for determining result quality; and updating the characteristic keyword score values based on the result quality of the top results.

2. The method of claim 1 wherein obtaining the characteristic information for each search engine includes determining the characteristic information based on search results retrieved by that search engine.

3. The method of claim 1 wherein obtaining the characteristic information for each search engine includes determining the characteristic information based on a description of the search engine.

4. The method of claim 1 wherein obtaining the characteristic information for each search engine includes determining characteristic keywords representing searching capabilities of that search engine.

5. The method of claim 1 wherein maintaining a score for each search engine further includes determining a score for each characteristic keyword for each search engine.

6. The method of claim 1 wherein selecting a search engine further includes selecting a search engine with the highest similarity.

7. The method of claim 6 further including:
causing execution of the query on the selected search engine;
obtaining search results retrieved by the selected search engine upon execution of the query; and
providing the search results in response to the query.

8. The method of claim 6 further including:
causing execution of the query on the selected search engine;
obtaining search results retrieved by the selected search engine upon execution of the query;
analyzing the quality of the search results based on the query and/or the characteristic information; and
scoring the selected search engine based on the quality of at least one of: the search results for the query and the characteristic keywords.

9. The method of claim 8 wherein scoring the selected search engine includes:
determining a weighted sum of frequencies of occurrence of the characteristic keywords in the search results; and
scoring the search engine based on said weighted sum of frequencies.

10. The method of claim 8 wherein scoring the selected search engine further includes accumulating scores for the selected search engine as a function of the quality of the search results for subsequent queries based on the characteristic information.

11. The method of claim 8 wherein selecting a search engine further includes determining a similarity between the query and the characteristic information for each search engine based on corresponding scores for each search engine.

12. The method of claim 11 wherein selecting a search engine further includes selecting a search engine based on the similarities.

13. The method of claim 12 wherein the server is implemented on the Internet and the client connects to the Internet for communicating with the search engines 14. The method of claim 1 wherein the search engines are implemented on one or more servers and selecting a search engine is performed by a client.

15. The method of claim 1 wherein obtaining the characteristic information for each search engine includes determining characteristic keywords from one of a frequently asked question (FAQ) web page and an about this website web page of that search engine.

16. An apparatus for providing access to information using search engines, comprising:
a processor having a hardware component the apparatus including
an information module configured for maintaining characteristic information including a plurality of characteristic keywords representing searching capabilities of each one of multiple search engines, wherein each characteristic keyword is assigned a characteristic keyword score value; and
a selector to receive a query having user selected keywords, the selector including
a scoring module configured for maintaining separate characteristic keyword score values for the plurality of characteristic keywords for each search engine, wherein the characteristic keyword score values are accumulated and updated over multiple searches;
wherein the selector is configured for determining a similarity value for each search engine based on the characteristic keyword score values associated with user selected query keywords and ranking the multiple search engines based on the similarity value of each search engine, the apparatus further configured to:
select a search engine among the multiple search engines for executing a query based on the rank of the multiple search engines;
send the query to the selected search engine;
obtain search results from the selected search engine;
select a predetermined number of obtained search results as top results;
analyze the top results for determining result quality; and
update the characteristic keyword score values based on the result quality of the top results.

17. The apparatus of claim 16 wherein the characteristic information for each search engine includes characteristic information based on search results retrieved by that search engine.

18. The apparatus of claim 16 wherein the characteristic information for each search engine includes characteristic information based on a description of the search engine.

19. The apparatus of claim 16 wherein the characteristic information for each search engine includes characteristic keywords representing searching capabilities of that search engine.

20. The apparatus of claim 16 wherein maintaining a score for each search engine further includes determining a score for each characteristic keyword for each search engine.

21. The apparatus of claim 20 wherein the selection module is further configured for selecting a search engine with the highest similarity.

22. The apparatus of claim 21 further comprising an application module configured for receiving the query, wherein the selector is further configured for causing execution of the query on the selected search engine.

23. The apparatus of claim 22 wherein the selector is further configured for obtaining search results retrieved by the selected search engine upon execution of the query, and providing the search results in response to the query.

24. The apparatus of claim 22 wherein the selector further includes
an analyzer configured for analyzing the quality of the search results based on the query and/or the characteristic information; and the scoring module is further configured for scoring the selected search engine based on the quality of at least one of: the search results for the query and the characteristic keywords.

25. The apparatus of claim 24 wherein the scoring module is further configured for scoring the selected search engine by determining a weighted sum of frequencies of occurrence of the characteristic information in the search results, and scoring the search engine based on said weighted sum of frequencies.

26. The apparatus of claim 24 wherein the selector further includes an updating module configured for accumulating scores for each selected search engine as a function of the quality of the search results for subsequent queries based on the characteristic information.

27. The apparatus of claim 26 wherein the selector is further configured for selecting a search engine based on the query and the accumulated scores for each search engine.

28. The apparatus of claim 20 wherein the selector further includes a selection module configured for selecting a search engine based on the similarities.

29. The apparatus of claim 24 wherein the similarity computation module is further configured for determining a similarity between the query and the characteristic information for each search engine based on corresponding scores for each search engine.

30. The apparatus of claim 29 wherein the selection module is further configured for selecting a search engine based on the similarities.

31. A client device for providing access to information using search engines, comprising:
- a processor including hardware components;
- an application module for receiving a query having one or more user selected query keywords; and
- a selector configured for maintaining separate characteristic keyword score values for a plurality of characteristic keywords for each search engine of a set of multiple search engines, wherein each characteristic keyword is assigned a characteristic keyword score value and the characteristic keyword score values are accumulated and updated over multiple searches, the client device configured to:
  - match the one or more user selected query keywords with the plurality of characteristic keywords to determine similarity values for each search engine based on characteristic keyword score values associated with user selected query keywords;
  - determine a rank of the multiple search engines based on similarity values by comparing the similarity values between each search engine and determining the search engine with a highest ranked similarity value;
  - select a search engine among the multiple search engines for executing a query based on the rank of the multiple search engines;
  - send the query to the selected search engine;
  - obtain search results from the selected search engine;
  - select a predetermined number of obtained search results as top results;
  - analyze the top results for determining result quality; and
  - update the characteristic keyword score values based on the result quality of the top results.

32. The client device of claim 31 wherein the search engines are implemented on one or more servers such that the client device is configured for communicating with the one or more servers via a communication link.

33. The client device of claim 32 wherein the servers are implemented on the Internet and the client device is configured for connecting to the Internet communicating with the search engines.

34. A method for providing access to information using search engines, comprising:
- obtaining a plurality of characteristic keywords representing searching capabilities of each one of multiple search engines;
- assigning a characteristic keyword score value for each of the plurality of characteristic keywords, wherein the characteristic keyword score values are accumulated and updated over multiple searches;
- receiving one or more user selected query keywords associated with a query;
- matching the one or more user selected query keywords with the plurality of characteristic keywords to determine similarity values for each search engine based on characteristic keyword score values associated with user selected query keywords;
- determining a rank of the multiple search engines based on similarity values by comparing the similarity values between each search engine and determining the search engine with a highest ranked similarity value;
- selecting a search engine among the multiple search engines for executing a query based on the rank of the multiple search engines;
- sending the query to the selected search engine;
- obtaining search results from the selected search engine;
- selecting a predetermined number of obtained search results as top results;
- analyzing the top results for determining result quality; and
- updating the characteristic keyword score values based on the result quality of the top results.

35. The method of claim 34, further comprising:
- adding new characteristic keywords for the selected search engine based on the top results.

36. A method for providing access to information using search engines comprising:
- obtaining characteristic information including a plurality of characteristic keywords representing searching capabilities of each one of multiple search engines, wherein each characteristic keyword is assigned a characteristic keyword score value;
- maintaining separate score values for the plurality of characteristic keywords for each search engine wherein the characteristic keyword score values are accumulated and updated over multiple searches;
- receiving query keywords associated with a query;
- determining a similarity value for each search engine based on the characteristic keyword score values and the query keywords associated with the query;
- selecting a search engine among the multiple search engines for executing the query using the query keywords by comparing the similarity values between and determining the search engine with a highest ranked similarity value;

wherein a characteristic keyword score value S is represented as:

$$S = \frac{\sum_{i=1}^{m} W_i^R W_i^P W_i^Q (f_i^T + f_i^S + f_i^e + f_i^B)}{\sum_{i=1}^{m} (f_i^T + f_i^S + f_i^e + f_i^B)}$$

wherein $W^R$ represents a weighting factor indicating ranking of a results page returned by the selected search engine, $W^P$ represents a weighting factor indicating where a user selected query keyword occurred in the results page, $W^Q$ is a weighting factor indicating whether the user selected query keyword is in both a search query and an existing characteristic keyword list for the selected search engine, T, S, B, and E for occurrence frequency f represent positions in the results page where a keyword can occur, m represents a number of search results selected for computing the score value S, wherein i is a positive number and represents an $i^{th}$ page in top m results.

* * * * *